US005889594A

United States Patent [19]

Maekawa

[11] Patent Number: 5,889,594

[45] Date of Patent: *Mar. 30, 1999

[54] BOTH-SIDE RECORDING APPARATUS AND CONTROL APPARATUS FOR CONTROLLING THE SAME

[75] Inventor: Shinichiro Maekawa, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 614,556

[22] Filed: Mar. 13, 1996

[30] Foreign Application Priority Data

Mar. 23, 1995 [JP] Japan .................................... 7-064161

[51] Int. Cl.[6] ........................... G03G 15/00; G03B 27/00

[52] U.S. Cl. ............................ 358/296; 399/364; 355/24

[58] Field of Search .............................. 355/24; 399/309, 399/364; 358/296; 347/262, 139

[56] References Cited

U.S. PATENT DOCUMENTS

| | | | |
|---|---|---|---|
| 4,466,733 | 8/1984 | Pels | 399/364 |
| 4,639,126 | 1/1987 | Bushaw et al. | 399/364 |
| 4,910,612 | 3/1990 | Yamazaki | 358/496 |
| 4,990,941 | 2/1991 | Kawai | 347/153 |
| 5,206,684 | 4/1993 | Wada et al. | 399/1 |
| 5,216,473 | 6/1993 | Maeyama | 399/364 |
| 5,243,439 | 9/1993 | Jacobus et al. | 358/448 |
| 5,287,158 | 2/1994 | Nagashima et al. | 399/14 |
| 5,557,390 | 9/1996 | Ito et al. | 399/85 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

Whether the number of prints is equal to or larger than a predetermined number or not is judged. Whether the total number of pages in a job is equal to an odd number or not is judged. When the total number of prints is equal to or larger than the predetermined number and when the total number of pages is equal to the odd number, the printer controller controls in a manner such that a final paper is fed by only a first feed and an image is printed to only the first side of the paper and the paper is ejected out. In the case where the total number of prints is less than the predetermined number and the total number of pages is equal to the odd number, the printer controller controls in a manner such that the final paper is fed by the first feed and an image is printed to the first side of the paper and, subsequently, the paper is fed by a second feed and an image is printed to a second side of the paper on the basis of blank page data and the paper is ejected out.

27 Claims, 9 Drawing Sheets

BOTH-SIDE RECORDING APPARATUS AND CONTROL APPARATUS FOR CONTROLLING THE SAME

BACKGROUND OF THE INVENTION

1. Field of the Invention

The invention relates to a recording apparatus which can perform a both-side recording and to a control apparatus for controlling such a recording apparatus.

2. Related Background Art

In recent years, as an output apparatus of a computer, a printing apparatus, for example, a laser beam printer is widely used. Recently, in order to realize a saving of resources and a saving of a space for documents, a number of both-side printers having a function for automatically printing both sides of a paper have been realized. According to the both-side printing apparatuses, a paper after completion of the printing of the first side is automatically reversed and is again fed and the second side is printed, thereby realizing a both-side printing.

When the total number of pages of a document to be printed is an odd number, only one side is printed to the final page. Therefore, there is considered a method such as.

(1) method whereby dummy blank paper data is given to the back side and the paper is again fed at once and is printed, or (2) method whereby the final page is compulsorily printed as one side.

However, in case of the method (1), since a sequence for the both-side printing and a sequence for the one-side printing of the final page are the same and both sides and one side can be printed without changing the sequence, there is no need to make a memory management or the like in the printer complicated. When a printing mode is changed from both side to one side, it can be smoothly changed. On the other hand, in case of copying a plurality of copies or the like, in spite of the fact that the one-side printing is performed for the user, a printing time which is twice as long as that in the ordinary one-side printing sequence is needed.

In case of the method (2), an inherent printing speed can be effected at the time of the one-side printing. However, in a document such that the change in printing mode from both side to one side is frequently executed, the operation of the printer is temporarily stopped by a refreshing operation or the like for a memory management or the like in the printer each time the sequence is changed, so that a smooth printing cannot be provided to the user.

SUMMARY OF THE INVENTION

It is an object of the invention to provide a printing apparatus which can solve the problems as mentioned above and can perform a both-side printing at a high speed even if the total number of print pages is an odd number.

According to the invention, there is provided a printing apparatus which has first feeding means regarding a first-side printing and second feeding means regarding a second-side printing and can perform a both-side printing, comprising: print number judging means for judging whether the number of prints is equal to a predetermined number or more or less; odd number judging means for judging whether the total number of pages in a job is equal to an odd number or not; and control means for controlling in a manner such that when it is judged to be YES by the print number judging means and it is judged to be YES by the odd number judging means, a final paper is fed by only the first feeding means and only the first side of the paper is printed and the paper is ejected out, and when it is judged to be NO by the print number judging means and it is judged to be YES by the odd number judging means, the final paper is fed by the first feeding means and the first side of the paper is printed and, subsequently, the paper is fed by the second feeding means and the second side of the paper is printed on the basis of blank page data, and the paper is ejected out.

According to the invention, whether the number of prints is equal to or larger than the predetermined number or not is judged by the print number judging means. Whether the total number of pages in the job is equal to an odd number or not is judged by the odd number judging means. When it is judged to be YES by the print number judging means and when it is judged to be YES by the odd number judging means, the control means controls in a manner such that the final paper is fed by only the first feeding means and only the first side of the paper is printed and the paper is ejected out. When it is judged to be NO by the print number judging means and when it is judged to be YES by the odd number judging means, the control means controls in a manner such that the final paper is fed by the first feeding means and the first side of the paper is printed and, subsequently, the paper is fed by the second feeding means and the second side of the paper is printed on the basis of the blank page data and the paper is ejected out by the control means.

DETAILED DESCRIPTION OF THE PREFERRED EMBODIMENTS

Preferred embodiments of the present invention will now be described hereinbelow with reference to the drawings.

FIRST EMBODIMENT

Figure 1:
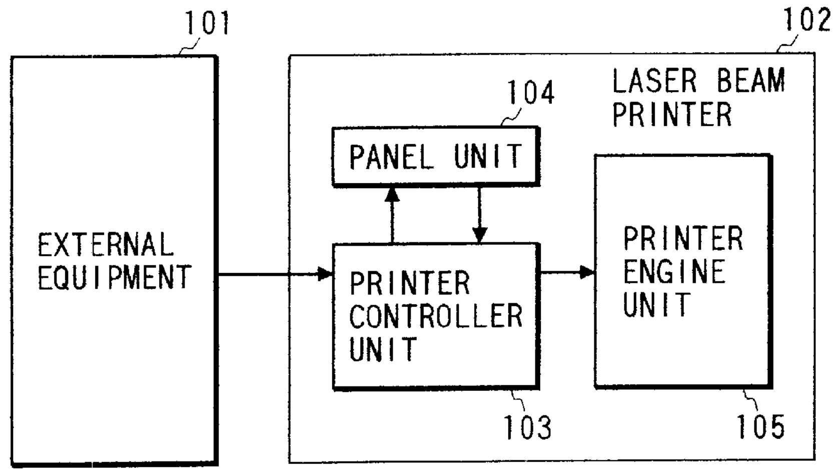
FIG. 1 is a block diagram showing the first embodiment of the invention.

FIG. 1 shows the first embodiment of the invention. In FIG. 1, reference numeral 101 denotes an external equipment such as a host computer or the like and 102 indicates a laser beam printer having a panel unit 104, a printer controller unit 103, and a printer engine unit 105. The panel unit 104 performs an interface with the user. The printer engine unit 105 executes a printing on the basis of binary or multi-value image data by a well-known electrophotographic process. The printer controller unit 103 forms page information comprising dot data on the basis of code data (ESC code, various PDLs, etc.) from the external equipment 101 and outputs to the printer engine unit 105.

Figure 2:
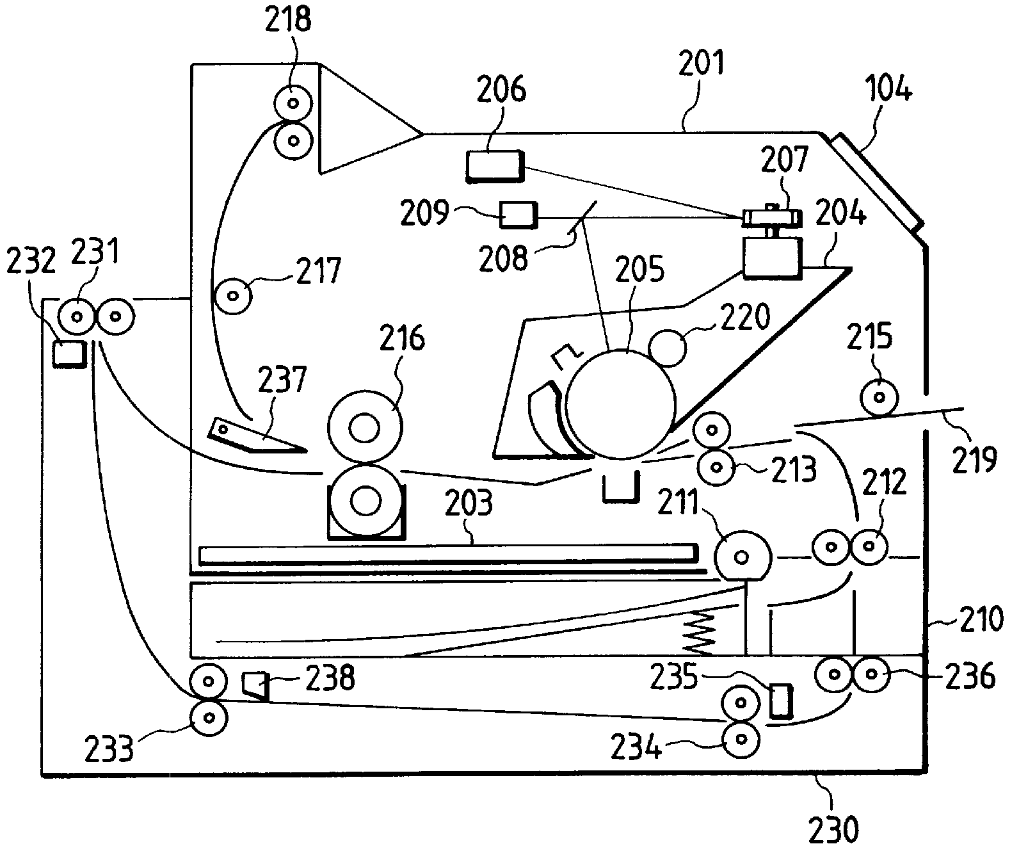
FIG. 2 is a cross sectional view showing a structure of a laser beam printer 102 shown in FIG. 1.

FIG. 2 shows a structure of the laser beam printer 102 shown in FIG. 1. Reference numeral 201 denotes a printer casing; 203 a control board enclosing portion having a control unit of the printer engine unit 105 and the printer controller unit 103 shown in FIG. 1; 210 a sheet cassette which holds papers and has a mechanism for electrically detecting a paper size by a partition plate (not shown); 211 a cassette feed roller for separating the papers one by one enclosed in the sheet cassette 210; 212 a conveying roller for conveying the paper separated from the sheet cassette 210; 213 a registration roller for temporarily stopping the paper for a correction of an oblique motion and a registration matching; 219 a tray for manual insertion; and 215 a manual feed roller for conveying the paper from the manual insertion tray 219.

Reference numeral 204 denotes a cartridge having a photosensitive drum 205 and a toner holding portion (not shown); 206 a laser driver to emit a laser beam from a semiconductor laser (not shown); 207 a rotary polygon mirror for scanning the laser beam from the semiconductor laser in the main scanning direction; 208 a reflecting mirror for leading the laser beam from the rotary polygon mirror 207 to the photosensitive drum 205; and 209 a beam detector, arranged at the scan start position of the laser beam, for forming a sync signal to decide an image writing timing of the main scan.

Reference numeral 220 denotes a developing unit for visualizing a latent image as a toner image; 216 a fixing roller for fixing the toner image with a heat; 217 a conveying roller; and 218 a paper ejecting roller for ejecting a paper after completion of the image fixing process to a paper ejection tray.

Reference numeral 230 denotes a detachable both-side unit; 237 a reversing flapper for switching a conveying path of the paper which passed through the fixing roller 216; 232 a reverse sensor for electrically detecting a rear edge of the paper; and 231 a reversing roller. When the rear edge of the paper is detected by the reverse sensor 232, the reversing roller 231 is reversely rotated. When there is a preceding paper, the driving of the reversing roller 231 is stopped until the preceding paper is extinguished. When there is no preceding paper, the reversing roller 231 is driven until a re-feed sensor detects a front edge of the paper. Reference numeral 238 denotes a temporary stop sensor for electrically detecting the front edge of the paper at a position where the paper after completion of the reverse is temporarily stopped; 233 and 236 conveying rollers; 234 a re-feed roller for conveying the reversed paper to the conveying roller 212; and 235 a re-feed sensor for judging the presence of the preceding paper when the front edge of the paper is electrically detected.

Figure 3:
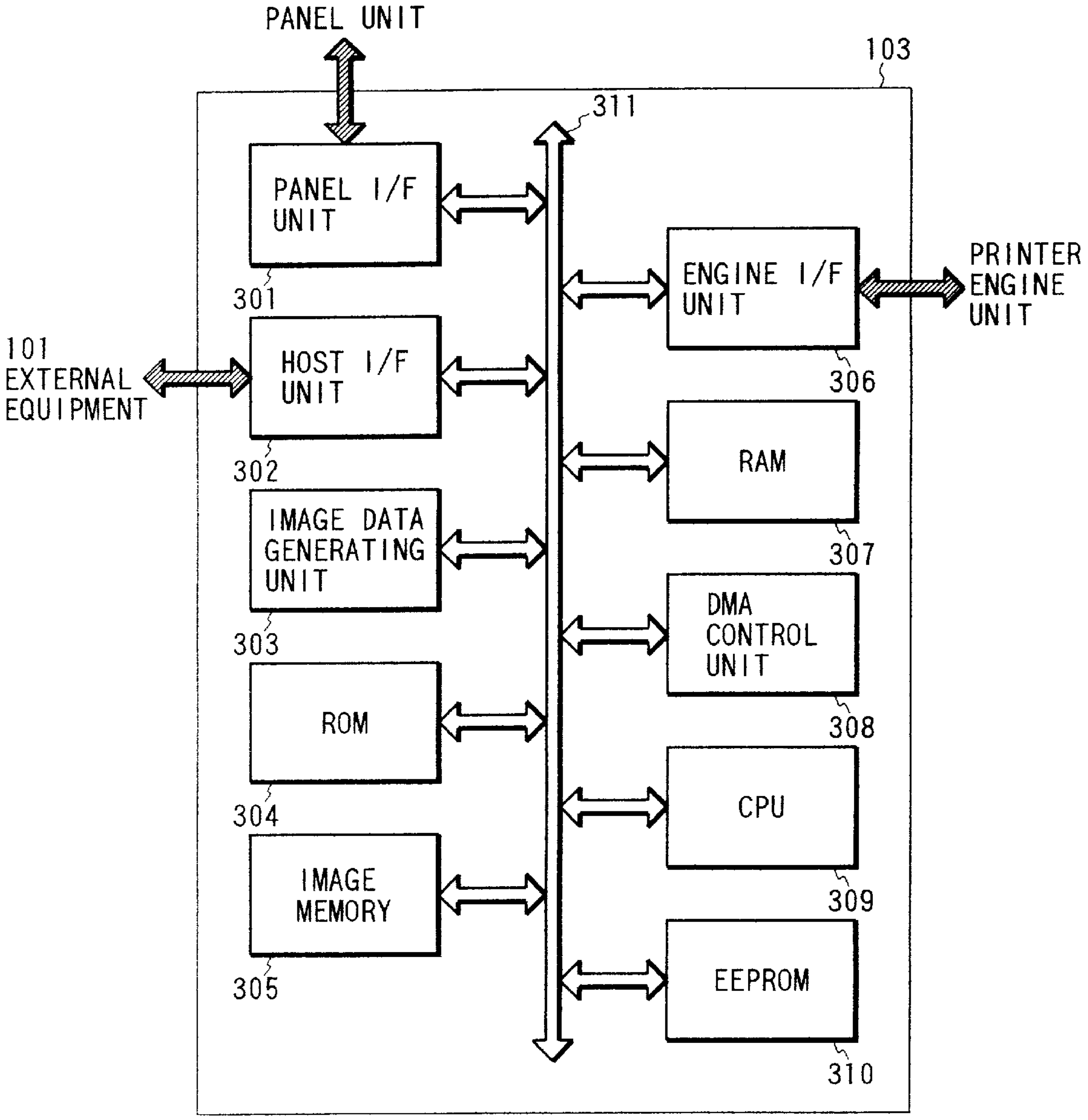
FIG. 3 is a block diagram showing a construction of a printer controller unit 103 shown in FIG. 1.

FIG. 3 shows a construction of the printer controller unit 103 shown in FIG. 1. In FIG. 3, reference numeral 301 denotes a panel interface (I/F) unit for receiving various set information and instructions from the operator through the panel unit 104; 302 a host interface unit serving as an input/output unit of signals which are transmitted and received to/from the external equipment 101; 306 an engine interface unit for transmitting a data signal from an output buffer register (not shown) and performing a communication control with the printer engine unit 105; 303 an image data generating unit for generating bit map data for an actual printing on the basis of control code data which is sent from the external equipment 101; 305 an image memory for storing image data; 309 a CPU (central processing unit) for controlling the whole printer controller unit 103; and 304 an ROM (read only memory) for storing a control code of the CPU 309. The control code is constructed by: an OS (operating system) which is time-divisionally controlled on a load module unit basis called a task by a system clock; and a plurality of load modules (tasks) which operate on a function unit basis. Reference numeral 307 denotes an RAM (random access memory) which is used as a temporary storage memory; 310 an EEPROM (electrically erasable and programmable read only memory); 308 a DMA (direct memory access) control unit for transferring the bit map data in the image memory to the engine interface unit 306 on the basis of an instruction from the CPU 309; and 311 a system bus having an address bus and a data bus.

Figure 4A:
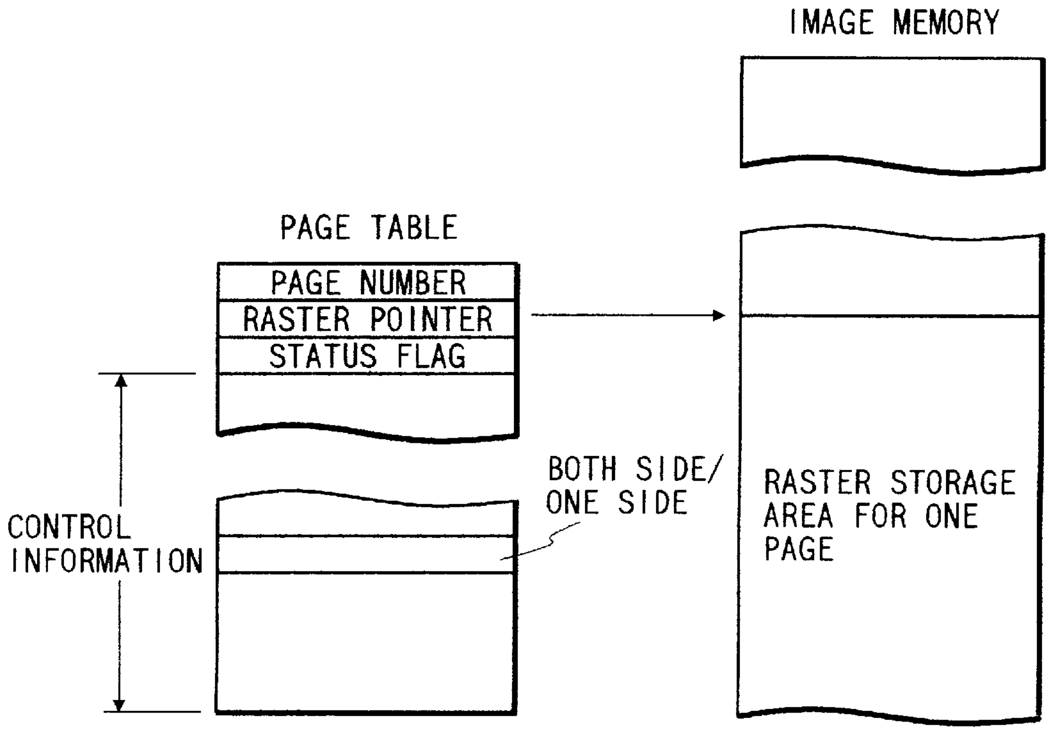
FIGS. 4A and 4B are diagrams showing a structure of a page table.
Figure 4B:
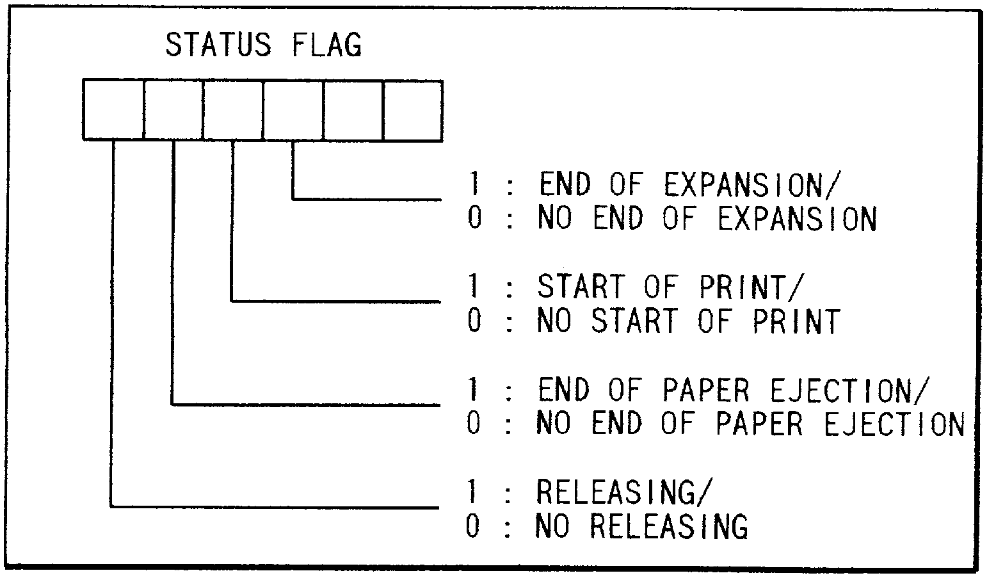

FIGS. 4A and 4B show a structure of a page table. The page table is a table to logically recognize each page in the CPU 304. A capturing and a releasing of the page table are managed by a page management function unit (not shown) in the RAM 307. A raster pointer shown in FIGS. 4A and 4B is a head pointer in an area of one page in the image memory 305. Upon initialization when a power supply is turned on, the CPU 304 divides the relevant area in the image memory denotes an area to store a flag showing a status of the page. There are a releasing flag, an end of expansion flag, a start of print flag, and an end of paper ejection flag.

Figure 5:
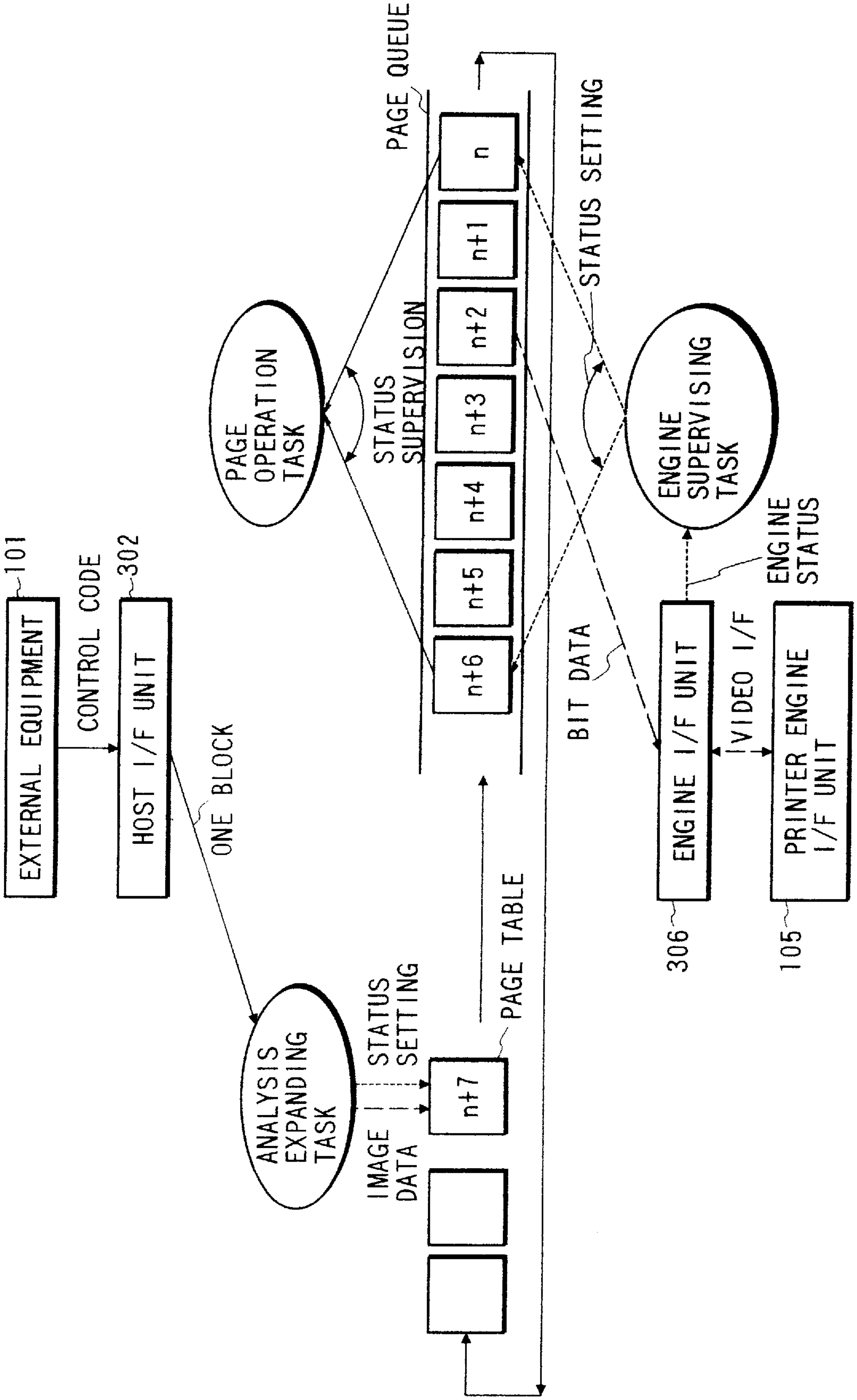
FIG. 5 is an explanatory diagram for explaining a data flow.

A data flow will now be described with reference to FIG. 5. Print data (control code, PDL, etc.) inputted from the external equipment 101 is stored into the host I/F unit 301 on a predetermined block unit basis. When data is detected from the host I/F unit 301, an analysis expanding task obtains the page table and analyzes the data on a block unit basis. With respect to image forming information (figure draw command of the PDL, character code, etc.), an image is expanded by using the image data generating unit 303 (FIG. 2) or the CPU 309 performs an image expansion and stores the expanded image into an area designated by the raster pointer of the page table. Control information (the number of copies, paper feed selection, etc.) for the printer is stored into the page table. After completion of the analysis and expansion of the data of one page, the "end of expansion flag" is set to TRUE and is enqueued into a page queue having an FIFO (first-in first-out) structure. A page operation task simultaneously supervises status flags of all of the pages in the page queue and changes a conveying procedure in accordance with the status and realizes a printing. The page table in which the "end of paper ejection flag" was set to TRUE is dequeued from the page queue and is returned to the page management function unit (not shown). An engine supervising task performs a communication at a predetermined period with the printer engine unit 105 through the engine I/F unit 306 and updates the "status flag" when a factor by which the status of the page is changed occurs.

A paper conveyance will now be described with reference to FIG. 10. In the both-side printing mode, the page operation task executes a printing process such that the paper is fed from a sheet cassette or a manual feed tray (position shown by reference numeral 253 in FIG. 10) to an a1 direction, a bit map of the page (n+1) in which an image should be printed to a back side is inverted and sent to the engine I/F unit and a video transfer is performed, thereby forming an image which was reversed by 180° (hereinafter, this printing process is referred to as a reverse print). After completion of the printing, the paper is ejected in an a2 direction. After that, the paper is reversed and conveyed in an a4 direction and is detected by a re-feed sensor. After that, the apparatus enters a re-feed standby state (the paper exists at a position shown by a reference numeral 252 in FIG. 10). The page operation task executes a printing by a normal printing process in a manner such that after confirming that the paper entered a re-feed standby state, the paper is again fed in an a5 direction from the re-feed standby state, the bit map of the page n in which an image should be printed to a front side is sent as it is to the engine I/F unit, and a video transfer is performed (hereinafter, this normal printing process is referred to as a normal print). After completion of the printing, the paper is conveyed in an a3 direction and is ejected to a paper ejection tray (the paper exists at a position shown by reference numeral 250 in FIG. 10). The ejected paper is a paper in which images were printed to both sides.

Figure 10:
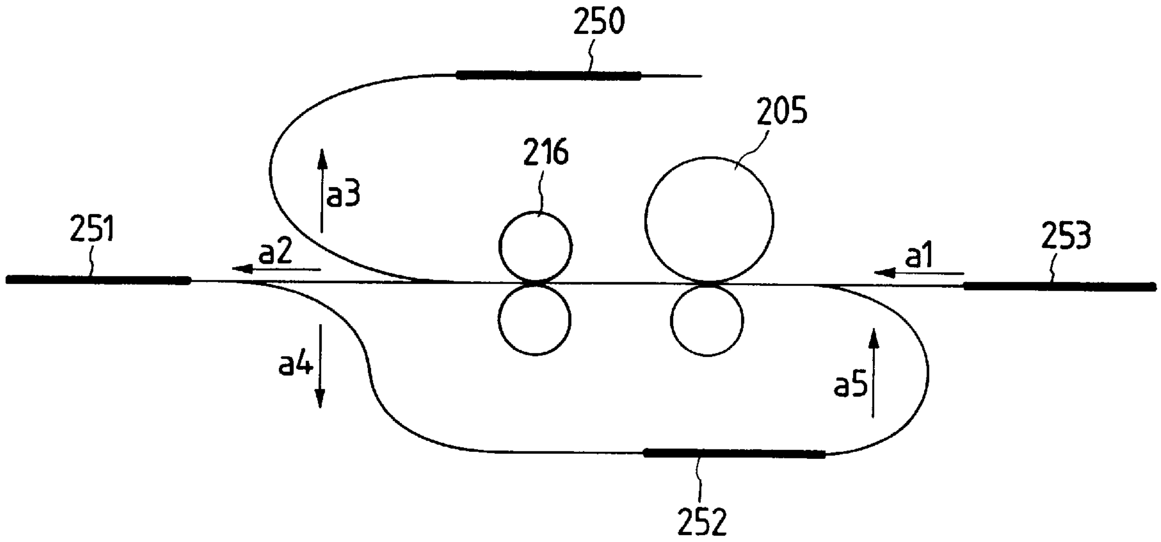
FIG. 10 is an explanatory diagram for explaining a both-side printing procedure.

In a one-side printing mode, the page operation task executes processes in a manner such that the paper is fed from the sheet cassette or manual feed tray (position shown by reference numeral 253 in FIG. 10) to the al direction, the normal print is executed, and after that, the paper is conveyed in the a3 direction and is ejected to the paper ejection tray (the paper exists at the position shown by reference numeral 250 in FIG. 10).

Since such a conveying sequence is performed, in the both-side printing mode, when one paper is printed, it takes a printing time that is twice as long as that in the one-side printing mode. The printer apparatus cannot predict whether the next page is subjected to the one-side printing or both-side printing from the data which is transmitted from the host. Therefore, the both-side printing sequence cannot start the printing unless the data of both sides, namely, data of two pages is fully obtained.

Therefore, the both-side printing in the case where the number of pages is equal to an odd number is executed in accordance with any one of the following procedures. Namely, (1) In the case where the external equipment counts the number of pages and a job is finished at an odd page, a blank page of paper is added and is sent to the printer as an even page.

(2) In the case where the job is finished at an odd page, a blank page of paper is formed in the equipment and is printed on the basis of a both-side sequence.

(3) In the case where the job is finished at an odd page, the final page is printed on the basis of the one-side sequence in the equipment.

Figure 6:
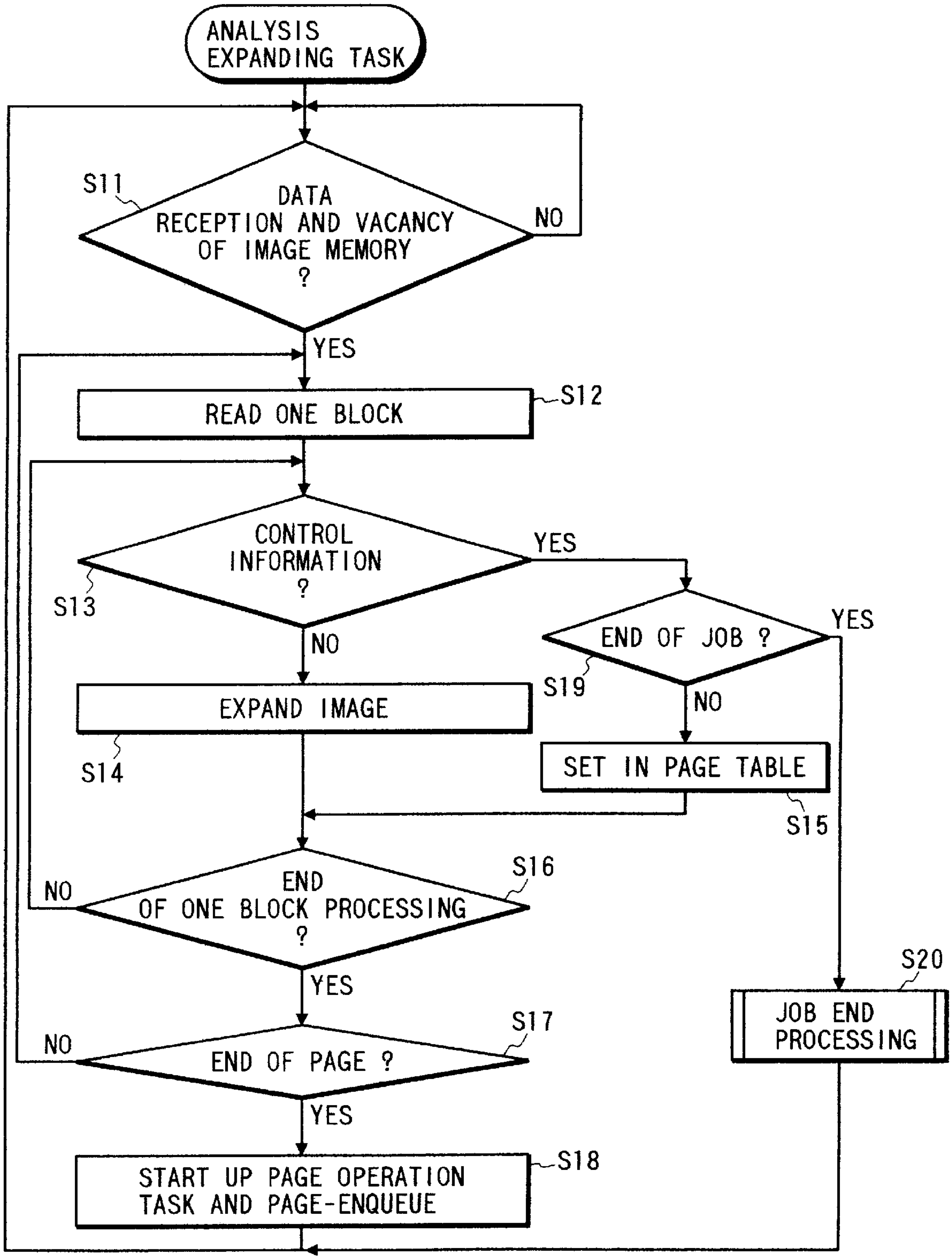
FIG. 6 is a flowchart showing an example of a control procedure of an analysis expanding task.

FIG. 6 is a flowchart showing an example of a control procedure for the analysis expanding task. When the analysis expanding task is started up at the time of turn-on of the power source, in step S11, the presence or absence of a data reception is inquired to the host I/F unit 302 at a proper period and, further, a vacant state of an area in the image memory 305 is inquired. When data exists and there is a vacant area, in step S12, the page table is obtained and the data of a predetermined one block is read out from the host I/F unit 320 and written into a work area for the CPU 309 in the RAM 307. Subsequently, in step S13, the control codes and data in one block are sequentially discriminated. When there is control information and, in step S19, when the job is not yet finished, in step S15, a proper data conversion is performed to the control information and, after that, the converted data is stored into the page table. When the job is finished, a job end processing is executed in step S20. After that, the processing routine is returned to step S11. On the other hand, when it is judged that there is no control information in step S13, step S14 follows and the image information is requested to the image data generating unit 303 or the image expansion is performed by the CPU 309 and the expanded image is stored into a predetermined area in the image memory 305. After that, the processes in steps S13 to S16 and S19 are repeated until the end of processes of one block.

When the processes of one block are finished, the processing routine advances to step S17. In step S17, an end of page is discriminated. If NO, the processing routine is returned to step S12. If YES, namely, when the process is finished at the end of page, in step S18, the page operation task is started up by requesting to the OS and the page table is enqueued to the page queue. After that, the processing routine is returned to step S11.

Figure 7:
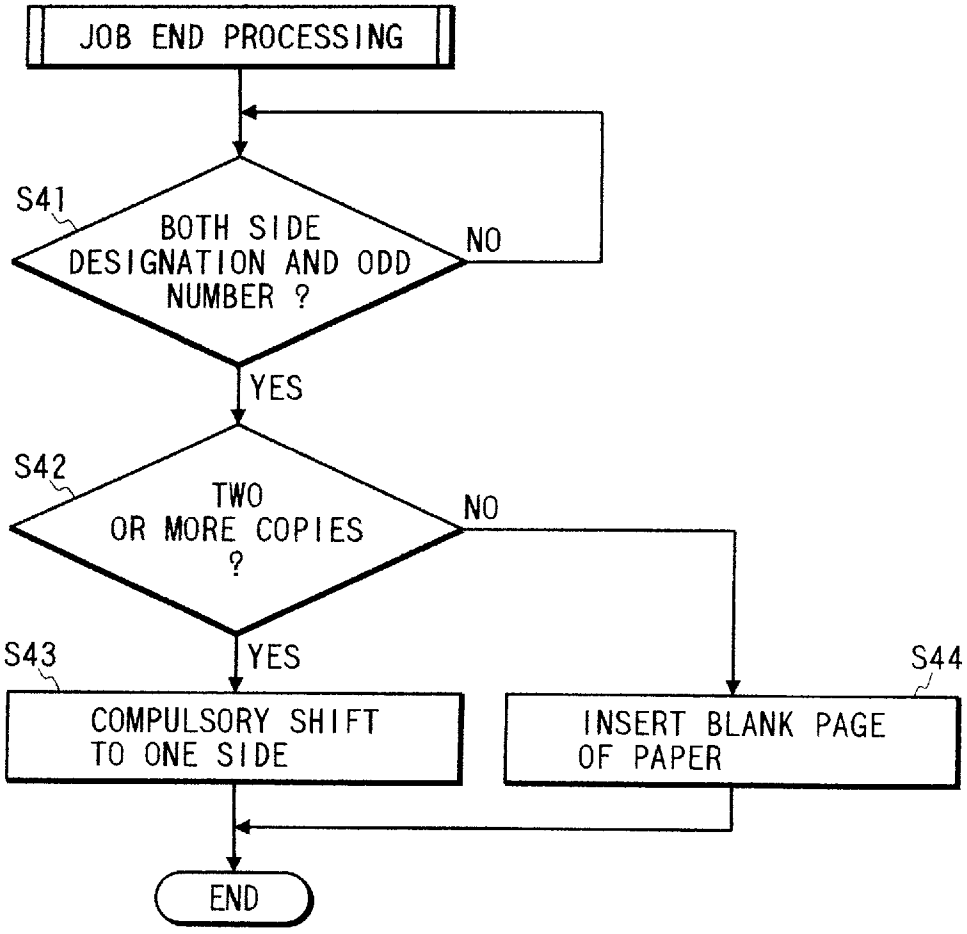
FIG. 7 is a flowchart showing an example of a control procedure of a job end processing in step S20 shown in FIG. 6.

FIG. 7 is a flowchart showing an example of a control procedure for the job end processing in step S20 shown in FIG. 6. In step S41, in the case where the job end processing is the both-side printing mode and the total number of pages in the job is equal to an odd number, step S42 follows. In step S42, a check is made to see whether the designated number of copies of the pages is equal to or larger than two pages or not. If YES, in step S43, the final page is set to the one-side printing mode. If NO in step S42, step S44 follows and a blank page of paper is formed and enqueued into the page queue. After that, the processing routine is finished.

Figure 8:
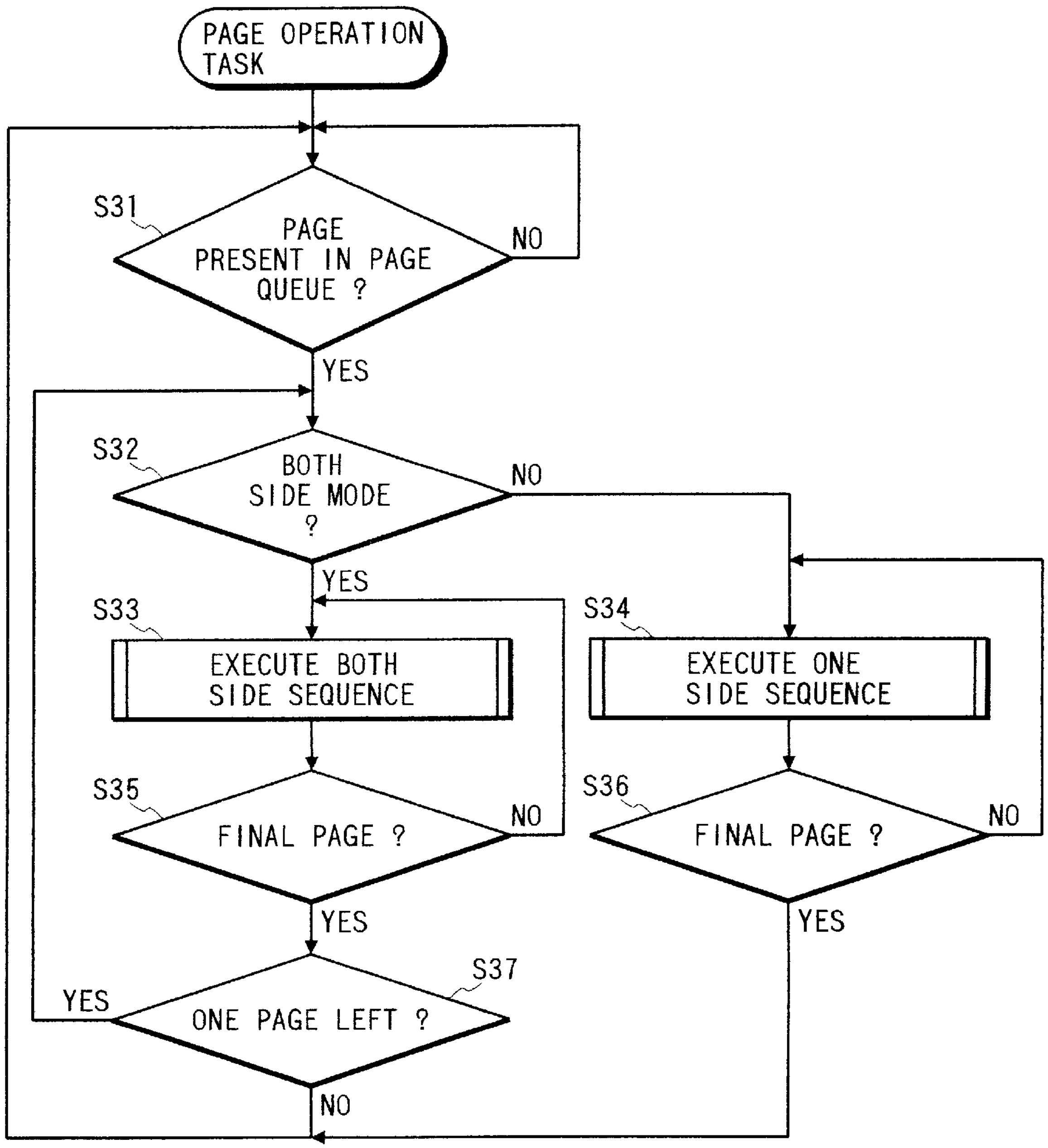
FIG. 8 is a flowchart showing an example of a control procedure of a page operation task.

FIG. 8 is a flowchart showing an example of a control procedure of the page operation task. When the page operation task is started up at the turn-on of the power source, in step S31, the page queue is supervised at a predetermined period and a check is made to see if the page exists in the page queue. If YES, in step S32, a check is made to see if the mode is the both-side printing mode. If YES in step S32, the both-side sequence is executed in step S33. In step S35, a check is made to see if the page is the final page. If NO, the processing routine is returned to step S33. After that, the processes in steps S33 and S35 are repeated each time the page number is increased until the final page (end of job). When the page reaches the final page, in step S37, when only one side (corresponding to one page) remains, the page table is switched to the one-page mode. The processing routine is returned to step S32.

When it is judged in step S32 that the mode is not the both-side mode, step S34 follows. In step S34, the well-known one-side sequence is executed. In step S36, a check is made to see if the page is the final page. If NO, the processing routine is returned to step S34. After that, each time the page number is increased, the processes in steps S34 and S36 are repeated. If YES in step S36, the processing routine is returned to step S31.

In the embodiment, since the processes are controlled as mentioned above, in the case where the number of pages in the job is equal to an odd number, so long as there is one copy, the both-side printing sequence in which the complicated control such as a memory clear or the like in the apparatus can be omitted and the total printing time can be reduced can be selected. On the other hand, when there are a plurality of copies, the one-side printing sequence can be selected and the printing performance of the printer engine unit 105 can be most effectively utilized. Therefore, the maximum throughput can be obtained.

In the embodiment, although the example of the laser printer has been described, so long as a printing apparatus which can realize the both-side printing by again feeding the paper to a sole printing unit by using the reversing apparatus, for example, an ink jet printer, a facsimile, a copying apparatus, and their compound apparatus can be used.

SECOND EMBODIMENT

In the first embodiment, the final page has been printed on the basis of the blank page data formed in the laser beam printer 102. However, in the second embodiment, the final page is printed on the basis of the blank page data from the external equipment 101.

Figure 9:
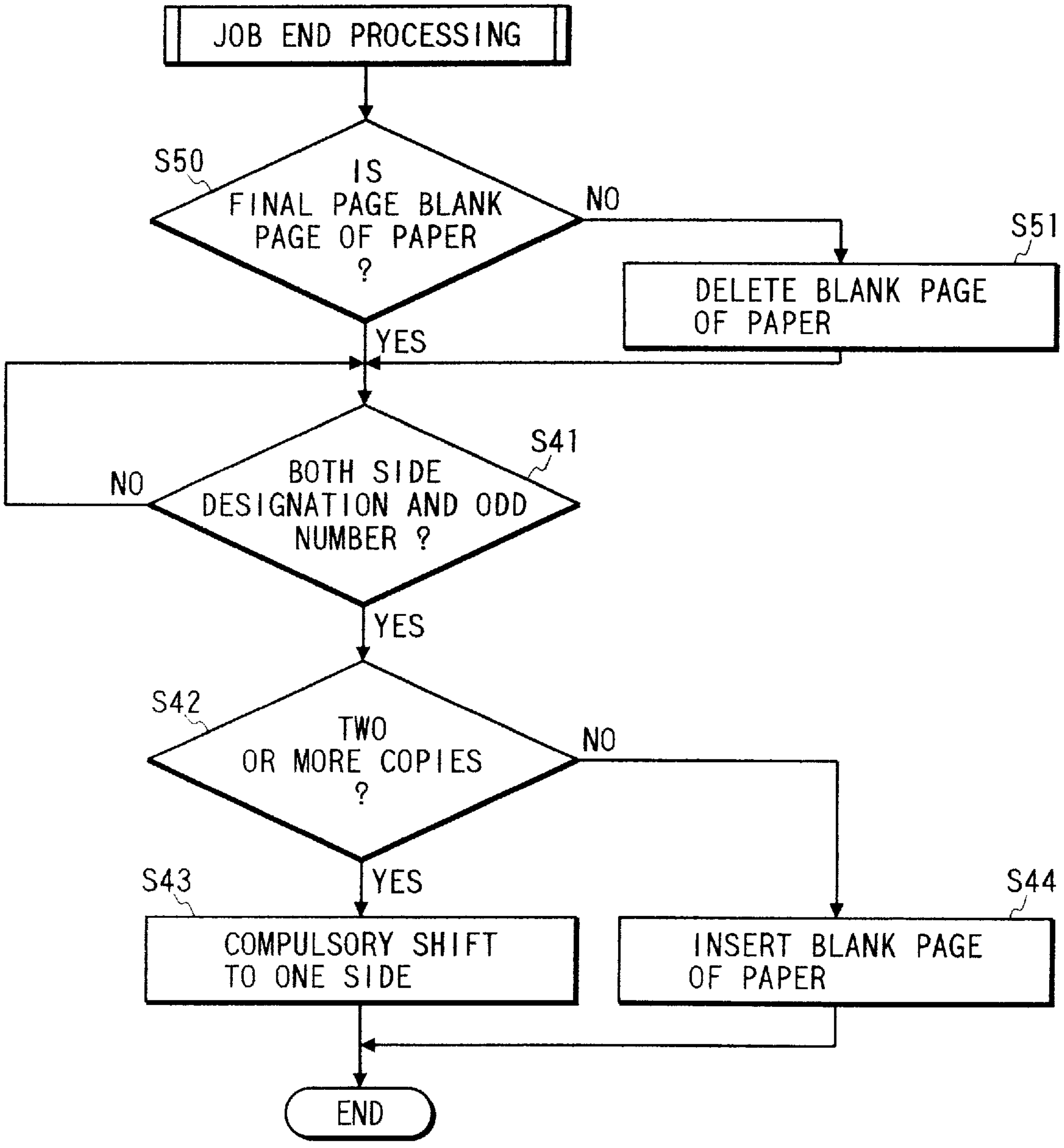
FIG. 9 is a flowchart showing an example of a job end processing procedure according to the second embodiment.

FIG. 9 is a flowchart showing an example of a job end processing procedure. In step S50, a check is made to see if the final page is a blank page of paper. If NO, in step S51, the blank page data is deleted. If YES, the processing routine advances to step S41. Since steps S41 to S44 are the same as those in FIG. 7, their descriptions are omitted.

As described above, according to the invention, since the invention has been constructed as mentioned above, even if the total number of print pages is equal to an odd number, the image data can be printed at a higher speed.

What is claimed is:

1. An apparatus for controlling a recording apparatus in which after an image was recorded to a first side of a recording medium, an image can be recorded to a second side of said recording medium, comprising:

judging means for judging whether the image is recorded to only one side of said recording medium or not; and selecting means for selecting a first mode to record the image to be recorded to only one side onto the first side of said recording medium and a second mode to record the image onto the second side in the case where a judgment result of said judging means is YES.

2. An apparatus according to claim 1, wherein in the case where the number of pages of a document to be recorded is equal to an odd number, said judging means judges that a final page of said document is recorded to only one side of said recording medium.

3. An apparatus according to claim 1, wherein said selecting means selects either one of said first and second modes on the basis of the number of pages of a document to be recorded.

4. An apparatus according to claim 1, wherein said selecting means selects the first mode when the number of pages of the document to be recorded is equal to or larger than a predetermined number.

5. An apparatus according to claim 1, further having:

means for inputting document information from an external equipment;

means for judging whether a final page of the inputted document information is a blank page or not; and means for deleting the final page when it is judged that the final page of the inputted document information is a blank page.

6. A recording apparatus comprising:

recording means in which after an image was recorded onto a first side of a recording medium, an image can be recorded onto a second side of said recording medium;

means for judging whether the image is recorded to only one side of said recording medium or not; and selecting means for selecting a first mode to record said image to be recorded onto only said one side to the first side of said recording medium and a second mode to record the image to the second side in the case where a judgment result of said judging means is YES.

7. An apparatus according to claim 6, wherein in the case where the number of pages of a document to be recorded is equal to an odd number, said judging means judges that a final page of said document is recorded to only one side of said recording medium.

8. An apparatus according to claim 6, wherein said selecting means selects either one of said first and second modes on the basis of the number of pages of a document to be recorded.

9. An apparatus according to claim 8, wherein said selecting means selects the first mode when the number of pages of the document to be recorded is equal to or larger than a predetermined number.

10. An apparatus according to claim 6, wherein said recording means records the image onto the recording medium by using an electrophotographic process.

11. A printing apparatus which has first feeding means regarding a first side printing and second feeding means regarding a second side printing and can perform a both-side printing, comprising:

print number judging means for judging whether the number of prints is equal to or larger than a predetermined number or not;

odd number judging means for judging whether the total number of pages in a job is equal to an odd number or not; and control means for controlling in a manner such that in the case where it is judged to be YES by said print number judging means and it is judged to be YES by said odd number judging means, a final paper is fed by only said first feeding means and an image is printed to only a first side of said paper and the paper is ejected, and that in the case where it is judged to be NO by said print number judging means and it is judged to be YES by said odd number judging means, the final paper is fed by said first feeding means and an image is printed to the first side of said paper and, subsequently, the paper is fed by said second feeding means and an image is printed to a second side of said paper on the basis of blank page data, and the paper is ejected.

12. An apparatus according to claim 11, wherein said blank page data is blank page data from a host.

13. An apparatus for controlling a recording apparatus, said controlling apparatus being provided with a transport path for re-transporting a recording medium, on a first side of which the recording is made, to recording means, comprising:

means for specifying a page to be recorded only to one side of the recording medium among plural pages of a document to be recorded for both sides; and control means for controlling said recording apparatus to discharge said recording medium without passing through said transport path after recording the page specified by said specifying means on said first side of the recording medium.

14. An apparatus according to claim 13, wherein said specifying means specifies a final page when a total number of pages of the document is an odd number.

15. An apparatus according to claim 13, further comprising:

means for inputting document information from an external equipment;

means for judging whether a final page of the inputted document information is a blank page; and means for deleting the final page when it is judged that the final page of the inputted document information is a blank page.

16. An apparatus according to claim 14, wherein said apparatus renders odd pages excluding the final page to be recorded on a second side of the recording medium and renders the final page to be recorded on the first side.

17. An apparatus according to claim 13, further comprising:

means for adding a blank page corresponding to a back side of said specified page; and a first mode of performing discharge without passing through said transport path and a second mode of performing passing through said transport path, relating to the recording medium on which the specified page is recorded, by said control means.

18. A recording apparatus comprising:

recording means;

a transport path for re-transporting a recording medium, on a first side of which recording is made, to said recording means;

means for specifying a page to be recorded only to one side of the recording medium among plural pages of a document to be recorded for both sides; and control means for performing control to discharge said recording medium without passing through a transport path after recording the page specified by specifying means on said first side of the recording medium.

19. An apparatus according to claim 18, wherein said specifying means specifies a final page when a total number of pages of the document is an odd number.

20. An apparatus according to claim 18, further comprising:

means for inputting document information from an external equipment;

means for judging whether a final page of the inputted document information is a blank page, and means for deleting the final page when it is judged that the final page of the inputted document information is a blank page.

21. An apparatus according to claim 19, wherein said apparatus renders odd pages excluding the final page to be recorded on a second side of the recording medium and renders the final page to be recorded on the first side.

22. An apparatus according to claim 18, further comprising:

means for adding a blank page corresponding to a back side of said specified page; and wherein the control means provides a first mode of performing discharge without passing through said transport path and a second mode of performing passing through said transport path, relating to the recording medium on which the specified page is recorded, by said control means.

23. A method for controlling a recording apparatus, there being provided with a transport path for re-transporting a recording medium, on a fist side of which the recording is made, to recording means, comprising the steps of:

specifying a page to be recorded only to one side of the recording medium among plural pages of a document to be recorded for both sides; and controlling said recording apparatus to discharge said recording medium without passing through said transport path after recording the page specified in said specifying step on said first side of the recording medium.

24. A method according to claim 23, wherein said specifying step specifics a final page when a total number of pages of the document is an odd number.

25. A method according to claim 23, further comprising the steps of:

inputting document information from an external equipment;

judging whether a final page of the inputted document information is a blank page or not; and deleting the final page when it is judged that the final page of the inputted document information is a blank page.

26. A method according to claim 24, wherein said control has odd pages excluding the final page to be recorded on a second side of the recording medium and renders the final page to be recorded on said first side.

27. A method according to claim 23, further comprising the steps of:

selecting one of a first mode of performing discharge without passing through said transport path and a second mode of performing passing through said transport path, relating to the recording medium on which the specified page is recorded; and adding a blank page corresponding to a back side of said specified page when said second mode is selected, wherein said controlling step is performed when said first mode is selected.

* * * * *

UNITED STATES PATENT AND TRADEMARK OFFICE
CERTIFICATE OF CORRECTION

PATENT NO. : 5,889,594

DATED : March 30, 1999

INVENTOR(S) : SHINICHIRO MAEKAWA

It is certified that error appears in the above-identified patent and that said Letters Patent is hereby corrected as shown below:

COLUMN 4,
Line 25, "memory" should read --memory every page and links the divided areas. Status flag--; and
Line 61, "al" should read --a1--.

COLUMN 10,
Line 18, "specifics" should read --specifies--.

Signed and Sealed this

Fifth Day of October, 1999

Attest:

Q. TODD DICKINSON

*Attesting Officer*

*Acting Commissioner of Patents and Trademarks*